United States Patent Office 3,700,642
Patented Oct. 24, 1972

3,700,642
POLYESTER-POLYOXYALKYLENE SULFONATE
COMPOSITIONS
Masao Mizuno and Keishiro Igi, Kurashiki, Japan, assignors to Kuraray Co., Ltd., Kurashiki City, Japan
No Drawing. Filed Dec. 2, 1970, Ser. No. 102,505
Claims priority, application Japan, Dec. 29, 1969,
45/45,824
Int. Cl. C08g 39/04
U.S. Cl. 260—75 S      16 Claims

ABSTRACT OF THE DISCLOSURE

Polyester compositions exhibiting improved dyeability and anti-static properties comprising an aromatic polyester and an effective amount of a polyoxyalkylene sulfonate represented by the formula:

$$(MO_3S)_lRO(AO)_mR'(SO_3M')_n$$

wherein A is an alkylene or aralkylene group; R and R' can be the same or different and are each selected from the group consisting of alkylene, arylene and alkarylene radicals; M and M' are alkali metals or alkaline earth metals; m is an integer greater than 3 and $l$ and $n$ are numbers which may be the same or different and which range from 0 to 2, inclusive, and satisfy the relationship that $l+n \geq 1$.

---

This invention relates to improved polyester compositions. More particularly, this invention relates to an improved aromatic polyester composition which can be formed into film or fibers and which exhibits excellent dyeability and anti-static properties.

In general, fiber- or film-forming polyesters, e.g. polyethylene terephthalate, exhibit a variety of superior physical properties. They generally exhibit, however, poor affinity to dyestuffs and also high crystallinity which renders such polymers difficult to dye. Fibers, films and other articles produced from such polyesters are also subject to the problems associated with static electricity such as sparking electrical discharges and the unpleasant sensations incidental to such discharges, as well as the attraction of dust and other dirt particles.

Many attempts have heretofore been made to improve the dyeability of polyesters by copolymerizing said polymers with various types of chemical compounds. It is well known that polyesters which can be easily dyed with disperse dyes can be obtained by copolymerizing the polyester with polyethylene glycol. U.S. Pat. 2,895,-946; U.S. Pat. 2,905,657 and Japanese Pat. No. Sho 39/14,838 disclose the copolymerization of a polyester and $CH_3(CH_2CH_2O)_mH$ or

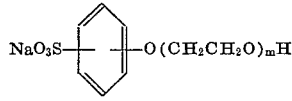

preferably together with a chain branching agent such as pentaerythritol to improve the dyeability of the polymer to disperse and basic dyes. Unfortunately, however, the modified polyester products obtained by such methods exhibit a loss in many of the favorable physical properties which are generally associated with the unmodified polyesters. For example, tenacity and Young's modulus are considerably lowered as compared with the unmodified polyester.

Japanese Pat. Sho 39/5,214 discloses that polyester fibers exhibiting good anti-static properties can be obtained by mixing and spinning a polyester with a polyethylene glycol of high molecular weight which is substantially insoluble in the polyester in an amount sufficient to form more than about 2% of an insoluble, discrete phase which can be observed microscopically. To obtain the desired anti-static properties, it is critical that the polyethylene glycol employed exhibit a molecular weight above about 20,000 and be incorporated into the polymer in an amount greater than about 2%. This additive must be uniformly admixed into the polyester to such a degree that observation of the insoluble phase by microscope is possible. If these requirements are not met, it has been found that the polymer will not exhibit the desired anti-static properties. Thus, to ensure the obtainment of said beneficial properties, it has been necessary to add high molecular weight polyethylene glycol in amounts of more than about 5%. It has been found, however, that fibers obtained by spinning such polyester compositions are subject to extraction of the polyethylene glycol during the dyeing operation. Control of this extraction is generally impossible resulting in non-uniform dyeing. Thus, although the method is helpful in imparting anti-static properties, it is not practical on a commercial basis.

Accordingly, it is an object of the present invention to provide polyester compositions exhibiting excellent dyeability with respect to disperse and basic dyes.

It is another object of the present invention to provide polyester compositions exhibiting excellent anti-static properties.

It is still another object of the present invention to provide polyester compositions exhibiting excellent dyeability and anti-static properties wherein said properties are essentially permanently retained.

These as well as other objects are accomplished by the present invention which provides an improved polyester composition exhibiting excellent dyeability and anti-static properties comprising an aromatic polyester containing an effective amount of a specific polyoxyalkylene sulfonate of relatively low molecular weight.

The present invention thus relates to an improved polyester composition comprising an aromatic polyester (hereinafter referred to as "the base polyester") containing an effective amount of a compound represented by the general formula:

$$(MO_3S)_lRO(AO)_mR'(SO_3M')_n \qquad (I)$$

wherein A is an alkylene or aralkylene group, preferably a lower alkylene or ar(lower alkylene) wherein the aryl moiety preferably contains from 6 to 12 carbon atoms; R and R' can be the same or different and are selected from the group consisting of alkylene, arylene and alkarylene; M and M' are alkali metals or alkaline earth metals, m is an integer greater than 3 and $l$ and $n$ are numbers which can be the same or different and which range from 0 to 2, inclusive, and satisfy the relationship $l+n \geq 1$.

The aromatic polyester or base polyester which forms the major component of the compositions of the present invention can be synthesized from one or more aromatic dicarboxylic acids or the lower alkylesters thereof and one or more diols. These polyesters can also be synthesized by the self-condensation of one or more aromatic hydroxycarboxylic acids or the lower alkylesters thereof.

Typical reactants which can be employed to form the base polyesters are, for example, terephthalic acid, naphthalene-2,6-dicarboxylic acid, diphenyl dicarboxylic acid, diphenyl-ether dicarboxylic acid, ethylene-1,2-bis(p-carboxylic phenoxides), p,p'-dicarboxyl-diphenyl sulfone and other similar aromatic dicarboxylic acids. p($\beta$-Hydroxyethoxy) benzoic acid and the like are illustrative of suitable aromatic hydroxycarboxylic acids. Isophthalic acid, phthalic acid, oxalic acid, adipic acid, sebacic acid, 6,6'-disulfonic caproic acid and the like are further illustrative of suitable diacids. Diethylene glycol, triethylene glycol, neopentyl glycol, bis-phenol A and the like are illustrative of suitable diols which can be employed to prepare the base polyesters of the present invention.

The polymerization reaction can be conducted in accordance with any of the known methods for preparing polyesters in either the molten or solid phase. The polymerization reaction can be conducted either in the presence or absence of conventional metallic polymerization catalysts of such metals as zinc, cobalt, manganese, calcium, magnesium, cadmium, titanium, tin, antimony, germanium and the like. Delustering agents such as titanium oxide can also be employed, as can heat stabilizers such as phosphoric acid or esters thereof, chain cross-linking agents such as trimethylol propane, pentaerythritol, benzene tricarboxylic acid and the like, as well as chain terminating agents such as methoxy polyethylene glycol.

It has been found in accordance with the present invention that the polyoxyalkylene sulfonate compounds represented by Formula I above impart excellent dyeability and anti-static properties to the base polyester.

These sulfonates can be synthesized by conventional organic synthesis methods. For example, one convenient route to obtain said sulfonates is as follows:

$$NaO_3S-R-O-(A-O)_n-RSO_3Na$$

Typical examples of the polyoxyalkylene sulfonates which can be employed in accordance with the present invention are as follows:

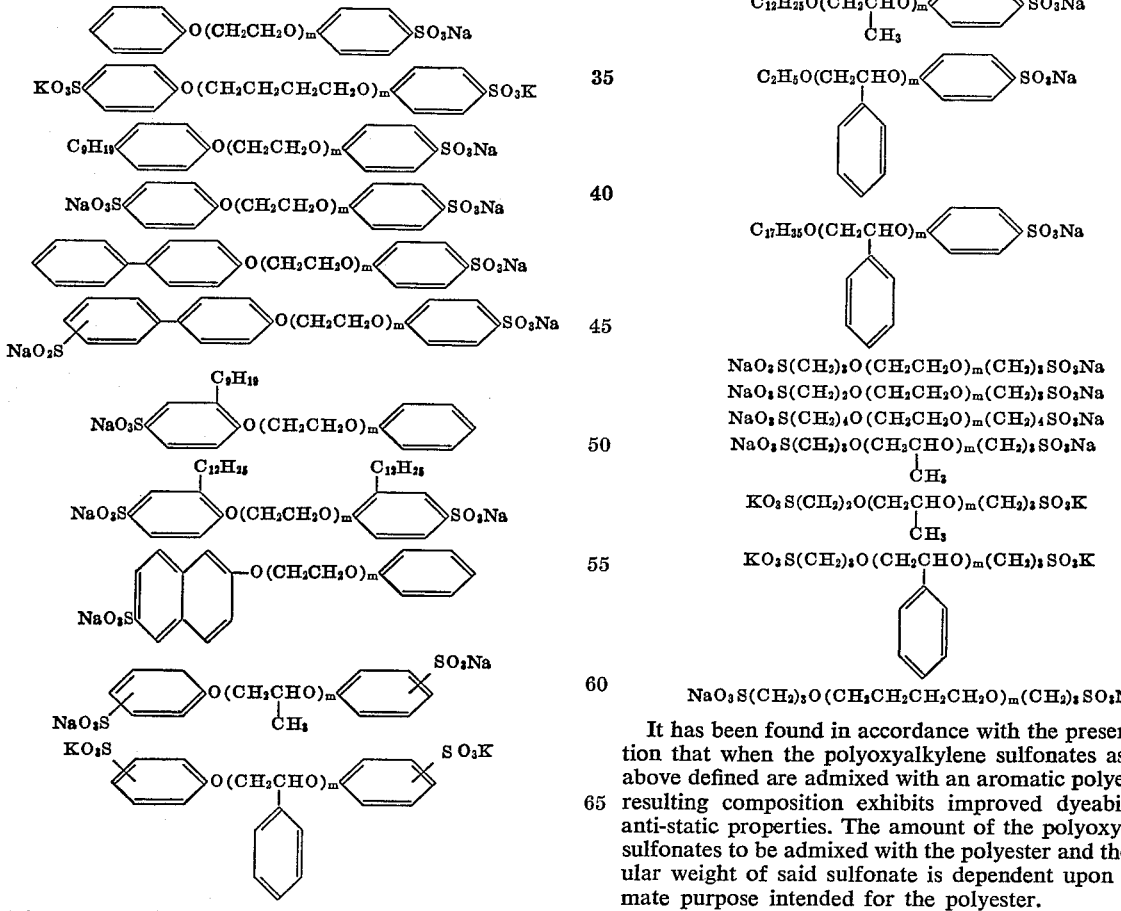

The polyoxyalkylene sulfonates of the present invention (compound (I) above) also include compounds encompassed by the following formulas:

$$R_1O(AO)_mR'(SO_3M')_1 \quad (II)$$

$$MO_3S(CH_2)_jO(AO)_m(CH_2)_kSO_3M' \quad (III)$$

wherein A, R', M and M' and m are as hereinabove defined, $R_1$ is an alkyl group containing from 1 to about 20 carbon atoms, $i$ is 1 or 2, and $j$ and $k$ which can be the same or different are 3 or 4. Illustrative examples of compounds (II) and (III) are as follows:

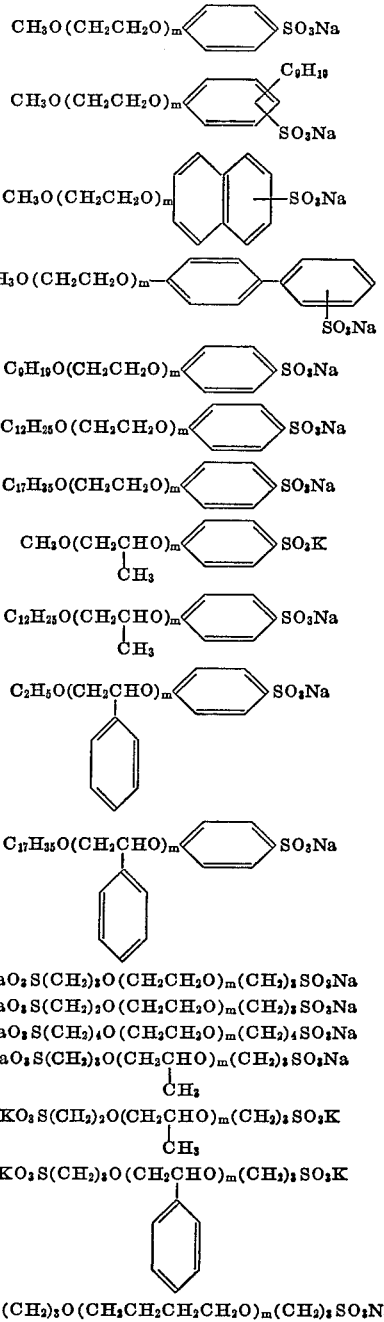

It has been found in accordance with the present invention that when the polyoxyalkylene sulfonates as hereinabove defined are admixed with an aromatic polyester, the resulting composition exhibits improved dyeability and anti-static properties. The amount of the polyoxyalkylene sulfonates to be admixed with the polyester and the molecular weight of said sulfonate is dependent upon the ultimate purpose intended for the polyester.

Thus, when the main purpose is to obtain a polyester composition which is readily dyed by basic dyes, the integer $m$ in the Formula I is an integer preferably larger than 3, and most preferably ranges from about 5 to about 30. The preferred compounds are readily compatible with the aromatic polyesters and are extremely effective in imparting dyeability thereto. The amount of sulfonate admixed with the polyester preferably ranges from about 0.5 to about 5 mole percent based on the acid component of the base polyester. It has been found that the smaller the amount of polyoxyalkylene sulfonate corresponding to Formula I above added to the polyester, the poorer is the basic dyeability imparted to the resultant polyester. However, the greater the amount of compound (I) above added to the polyester, the poorer are the resultant physical properties of the polyester. As the value of $m$ in Formula I above decreases, it has been found that the resulting compound becomes progressively incompatible with the base polymer. Whereas, as the value of $m$ increases, the resulting compound becomes progressively ineffective to the point where large, even excess, amounts of the compound are needed for the present purpose.

It is quite surprising that the relatively low molecular weight compounds of the type defined in Formula I above when employed in accordance with the present invention, cannot be extracted from the polyester composition when it is dyed with basic dyes or washed.

If, however, the main objective is to prepare a polyester exhibiting enhanced anti-static properties, compounds of the type defined in Formula I above are preferably admixed with the polyester wherein the average molecular weight of the alkylenoxy or aralkyleneoxy moiety (AO) of the compound (I) ranges from about 450 to about 10,000. The polyalkylene glycols heretofore employed for purposes of anti-static improvement were generally of substantially higher molecular weight, for example, higher than about 10,000 to 20,000. Moreover, it was heretofore necessary when employing said polyalkylene glycols that they exist as an independent, unresolved phase especially in the case of fibers with the longer axis thereof oriented along the fiber axis. If the polyalkylene glycol does not form an independent, unresolved phase in the polyester, it does not impart anti-static properties to the polyester. The formation of such independent and unresolved phases in the polyester occurs by copolymerization of the polyalkylene glycol or complete mixing thereof into the polyester. Moreover to accomplish such purposes, more than 5% of the polyalkylene glycol must be admixed with the polyester under carefully controlled mixing conditions. It has been found, however, that the polyester fibers heretofore obtained by admixing more than 5% of a polyalkylene glycol with a polyester exhibit a substantial deterioration in the physical properties of the base polymer. Additionally, it has been found that uniform dyeing of the resulting fiber is often quite difficult. Still further, the anti-static properties which are obtained are only temporary because the polyalkylene glycol is easily extracted from the fiber during the dyeing and/or washing operations.

In accordance with the present invention, the preferred average molecular weight of the alkyleneoxy or aralkyleneoxy moiety of compound (I) ranges from about 450 to about 10,000. When the molecular weight of the alkyleneoxy or aralkyleneoxy moiety is much less than about 450, the compound is hardly soluble in the polyester. It is possible, however, to employ polyesters of the desired composition wherein the alkyleneoxy or aralkyleneoxy moieties exhibit an average molecular weight slightly less than about 450, although the solubility of such compounds in the polyester is not very high. Moreover, such compounds can be extracted rather easily from the polyester with water so that the anti-static properties imparted thereto will not last for as long a period of time. Also, such compounds can be extracted from the polyester composition when using dyeing baths other than in the case of dyeing with basic dyes so that satisfactory dyeing can hardly be achieved. The addition of compounds containing alkyleneoxy or aralkyleneoxy moieties with an average molecular weight of more than 10,000 is considered unsuitable even though such compounds can be easily blended with the polymer, as it requires addition in large amounts, i.e., more than about 3%, and results in the deficiencies described hereinabove.

Compounds of the type defined in Formula I above can be added to the aromatic polyester in amounts ranging from about 0.2 to about 3% by weight and most preferably from about 1 to about 2.5% by weight. When said compounds are added in amounts less than about 0.2%, the anti-static properties and excellent disperse dyeability will not be obtained even though said compounds and the polyester are compatible. Addition of more than 3% of such compound will impart anti-static properties to the polymer, however, it has been found that the softening point of the resulting polyester will drop proportionately with the increase in addition, thereby deteriorating the weather resistance and heat resistance of the polymer as well as other mechanical properties.

The number of sulfonate acid groups contained in compound (I) of the present invention can range from about 1 to about 4 per molecule. The anti-static properties will not be imparted to the polymer without the presence of the sulfonate group; however, the presence of more than four groups will adversely effect the solubility and/or blendability of compound (I) in the polyester.

The metallic portions of the sulfonate, M and M', can be any alkali metal or alkaline earth metaal such as lithium, sodium, potassium, magnesium, calcium, strontium, barium and the like. Sodium and potassium are, however, most desirable for use in accordance with the present invention. R and R' in the foregoing Formula I can be the same or different and can each be a divalent alkylene radical, preferably containing from 1 to about 20 carbon atoms; a divalent arylene radical, preferably containing from 6 to 12 carbon atoms such as phenylene, biphenylene and naphthylene; or a divalent alkarylene radical, preferably containing from about 7 to about 32 carbon atoms. Illustrative of suitable alkyleneoxy or aralkyleneoxy moieties are polyoxyethylene, polyoxypropylene, polyoxy-n-butylene, polystyrene oxide and the like.

The polyester compositions of the present invention can be prepared by admixing said polyoxyalkylene sulfonate compounds (I) with the starting reactants or monomers for the synthesis of the polyester prior to such synthesis or to the polymer upon the completion of such synthesis. For example, they can be added to the reaction mass during the polymerization reaction or after completion of polymerization while the polyester is still in the molten state. In either case, the sulfonate compound can be either solid, molten or melted or dispersed in a medium which is inert to both compound (I) and the polyester. It is also possible, for example, to employ master batch techniques wherein a polyester is admixed with a high concentration of compound (I) and the resulting masterbatch is then admixed with another polyester. It is also possible to mix, melt and extrude the polyester and said compound (I) both being in the solid state initially by conventional extrusion techniques.

Thus, compound (I) of the present invention can be admixed with a polyester at any desired time before molding of the polyester product is completed. When it is necessary or desired to have the additives uniformly dispersed in the product, it is considered advantageous to add the compound before the completion of polymerization reaction. As will be seen in the examples below, the polyoxyalkylene sulfonates are easily admixed with the polyesters as compared with additives heretofore employed.

The improved polyesters of the present invention can be easily dyed with basic dyestuffs or disperse dyes regardless of the specific type of compound (I) employed. Moreover, the polyesters of the present invention exhibiting improved anti-static properties can be easily processed for the formation of fibers, films or other products by conventional methods.

The improved polyesters of the present invention can be spun, drawn and heat treated in substantially the same manner as employed with conventional polyesters. The mechanical properties, weather or heat resistance and the like of the resulting products are also similar to those conventionally employed. Moreover, the fibers obtained from the polyesters of the present invention exhibiting improved anti-static properties are not affected by electrical charging caused when said fibers are rubbed against many kinds of materials. The anti-static properties are still effective in the fiber or other products which are mix spun from the polyesters of the present invention and other fibers. Further, the polyester fibers of the present invention exhibit the anti-static properties even inside the fiber structure, quite unlike other fibers which have been coated with anti-static agents on the surface thereof by post treatment. Accordingly, the effects obtained by the present invention are quite long lasting and will not be lost through abrasion or washing. This is also true of other products obtained through the present invention such as film.

The following examples further illustrate the present invention. Unless otherwise specified, all percentages and parts are by weight.

In the following examples, the fibers were dyed in the following manner:

(A) Dyeing with basic dye

Dye-bath:
  Bath ratio _____ 50:1.
  Dye concentration _____ 2% OWF.
  Acetic acid _____ 0.3% OWF.
Dyeing temperature _____ 98 or 120° C.
Time _____ 120 min.

EXAMPLES 1–9

Polyethylene terephthalate was melt-polymerized and synthesized by the conventional method from dimethyl terephthalate and ethylene glycol, with zinc acetate as catalyst and a small addition of titanium dioxide. The chemical compound (A) below was added and mixed in the reaction vessel in the solid state in varying ratios. The reactants were melt-spun from a spinning aperture located at the bottom of the reaction vessel.

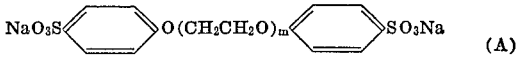 (A)

The resulting fibers were then drawn and heat treated in a conventional manner. The resultant product was a white fiber having a tensile strength of 3.6 to 4.6 g./d. and an elongation ratio of 43–20%. All processing operations were conducted with ease. The fiber thus obtained was then knitted, and the anti-static properties thereof were measured after the spinning oil was removed. Table 1 illustrates the results with the comparative examples.

The fibers obtained from Examples 3, 4, 6 and 7 were dyed to medium or deep shades with disperse dyes Diacelliton Fast Violet 5R (C.I. Disperse Violet 1), Eastman Polyester Red B (C.I. Disperse Red 88), Dispersol Fast Orange B (C.I. Disperse Orange 13) and Latyl Blue FLM (C.I. Disperse Blue 27). However, the fiber obtained from comparative Example 12 was not dyed with the same disperse dyes.

Table 1 illustrates the improved anti-static properties of the present invention as compared with those obtained using polyethylene glycol.

TABLE 1

| Examples | Amount of compound added (wt. percent) | | Avg. MW. of the polyoxyethylene radical | Charge potential [1] (voltage) | | Test with cigarette ash | Observation |
|---|---|---|---|---|---|---|---|
| | | | | The first time | After washing 10 times | | |
| Example 1 | (A) | 1.0 | 600 | 70 | 100 | ◎ | |
| Control 1 | Polyethylene glycol. | 1.0 | 600 | 3,620 | 3,500 | X | Drop in the viscosity at the time of addition great; required repolymerization. |
| Example 2 | (A) | 1.5 | 600 | 140 | 140 | ◎ | |
| Example 3 | (A) | 2.0 | 600 | 85 | 160 | ◎ | |
| Example 4 | (A) | 2.5 | 600 | 85 | 130 | ◎ | |
| Control 2 | Polyethylene glycol. | 2.5 | 600 | 3,400 | 4,250 | X | Drop in the viscosity at the time of addition remarkable; required repolymerization. |
| Control 3 | (A) | 1.0 | 200 | 2,110 | 3,300 | X | Large particles observed; frequent breakage of fiber at spinning. |
| Control 4 | (A) | 5 | 600 | 1,240 | 3,750 | △ | Uneven drawing; too many naps; waxy to touch; decrease in strength. |
| Control 5 | (A) | 0.1 | 600 | 3,530 | 3,280 | X | |
| Example 5 | (A) | 1.0 | 2,060 | 110 | 170 | ◎ | |
| Control 6 | (A) | 0.2 | 2,060 | 830 | 1,000 | ○ | |
| Control 7 | Polyethylene glycol. | 1.0 | 2,060 | 2,990 | 3,750 | X | Drop in the viscosity at the time of addition; required repolymerization. |
| Example 6 | (A) | 2.0 | 2,060 | 190 | 120 | ◎ | |
| Example 7 | (A) | 5 | 2,060 | 90 | 140 | ◎ | Uneven drawing; too many naps; waxy to touch. |
| Example 8 | (A) | 1.0 | 6,000 | 170 | 200 | ◎ | |
| Example 9 | (A) | 0.1 | 6,000 | 1,750 | 2,140 | △ | |
| Control 8 | Polyethylene glycol. | 1.0 | 6,000 | 3,820 | 3,900 | X | Drop in the viscosity at the time of addition; required repolymerization. |
| Control 9 | do | 1.0 | 10,000 | 3,200 | 4,400 | X | |
| Control 10 | do | 1.0 | 20,000 | 2,360 | 2,800 | X | |
| Control 11 | do | 2.0 | 20,000 | 2,250 | 2,200 | X | |
| Control 12 | do | 4.0 | 20,000 | 1,440 | 1,900 | ○ | Uneven drawing; too many naps; waxy to touch. |
| Control 13 | None | 0 | 0 | 5,560 | 4,650 | X | |

[1] Charge potential generated by sample being rubbed against cotton at 20° C., 35% relative humidity.

Note for Table 1 above:
The knitted cloth was brought to the distance of 5 cm. from cigarette ash immediately after rubbing against cotton cloth.
X Adsorps cigarette ash vigorously.
△ Slightly adsorps cigarette ash.
○ Hardly adsorps cigarette ash (ash slightly stirs).
◎ Does not adsorp cigarette ash at all (ash never stirs).

(B) Dyeing with disperse dye

Dye-bath:
  Bath ratio _____ 50:1.
  Dye concentration _____ 2% OWF.
  Dispersing agent _____ Disper TL 5% OWF.
Dyeing temperature _____ 98° C.
Time _____ 90 min.

EXAMPLES 10–11

Employing the same procedure as in the above examples, the compounds set forth in Table 2 were employed in lieu of the compound (A), and fiber-forming, knitting and measurement were effected in the same manner as in the above examples. The results are given in the following Table 2.

TABLE 2

| Examples | Compound added | Amount (wt. percent) | Average molecular weight of the polyoxyethylene radical | Charge potential [1] (voltage) | | Observation |
|---|---|---|---|---|---|---|
| | | | | The first time | After washing 10 times | |
| Example 10 | $C_9H_{19}$—⟨⟩—$O(CH_2CH_2O)_m$—⟨⟩—$SO_3Na$ | 2.0 | 1,000 | 120 | 450 | |
| Control 14 | Same as above | 2.0 | 100 | 1,280 | 1,940 | Large particles observed; frequent breakage of fiber at spinning. |
| Control 15 | $C_9H_{19}$—⟨⟩—$O(CH_2CH_2O)_m$—⟨⟩ | 2.0 | 1,000 | 3,000 | 4,300 | |
| Control 16 | Same as above | 7.0 | 1,000 | 18.50 | 2,400 | |
| Example 11 | $NaO_3S$—⟨⟩—$O(CH_2CHO)_m$—⟨⟩—$SO_3Na$ (with $CH_3$ branch) | 1.5 | 800 | .80 | 340 | |
| Control 17 | Same as above | 0.1 | 800 | 2,360 | 2,500 | |
| Control 18 | do | 8.0 | 800 | 90 | 180 | Decrease in strength; too many naps. |
| Control 19 | $HO(CH_2CHO)_mH$ (with $CH_3$ branch) | 8.0 | 25,000 | 440 | 1,350 | Do. |

[1] Charge potential generated by sample being rubbed against cotton at 20° C., 35% relative humidity.

EXAMPLES 12–15

Various polyesters were melt-blended with the compound:

$$NaO_3S-\langle\rangle-O(CH_2CH_2O)_m-\langle\rangle-SO_3Na \quad (B)$$

(where the average molecular weight of polyoxyalkylene was about 750) and melt-spun into continuous filaments, that were drawn, heat-set and knitted. The knitted cloth was subjected to the static electricity test.

The results are summarized in Table 3.

EXAMPLE 16

The following were charged to a reaction vessel, which was heated to 180° C. while being agitated:

| | Parts |
|---|---|
| Dimethyl terephthalate | 250 |
| Ethylene glycol | 240 |
| Zinc acetate | 0.1 |
| ([1]) | 10 |

($m$: 15 approximately).

[1] $NaO_3S$—⟨⟩—$O$—$(CH_2CH_2O)_m$—⟨⟩—$SO_3Na$

TABLE 3

| Examples | Molecular structure of polyester | Compound added | Amount (wt. percent) | Charge potential (voltage) | |
|---|---|---|---|---|---|
| | | | | The first time | After washing 10 times |
| Example 12 | $-[OC-\langle\rangle-COCH_2CH_2O]-$ | (B) | 2.0 | 140 | 340 |
| Control 20 | Same as above | None | 0 | 3,200 | 5,600 |
| Control 21 | do | Polyethylene glycol of molecular weight 20,000. | 2.0 | 1,980 | 2,400 |
| Example 13 | $-[OC-\langle\rangle-OCH_2CH_2O-\langle\rangle-COOCH_2CH_2O]-$ | (B) | 2.0 | 230 | 330 |
| Control 22 | Same as above | None | 0 | 4,200 | 5,000 |
| Control 23 | do | Polyethylene glycol of molecular weight 20,000. | 2.0 | 1,670 | 1,900 |
| Example 14 | $-[OCH_2CH_2O-\langle\rangle-CO]-$ | (B) | 2.0 | 70 | 130 |
| Control 24 | Same as above | None | 0 | 4,400 | 5,900 |
| Control 25 | do | Polyethylene glycol of molecular weight 20,000. | 2.0 | 1,300 | 2,200 |
| Example 15 | 5 mol percent of $CH_3OOC-\langle\rangle(SO_3Na)-COOCH_3$ copolymerized polyethylene terephthalate. | (B) | 2.0 | 100 | 250 |
| Control 26 | Same as above | None | 0 | 1,700 | 3,050 |
| Control 27 | do | Polyethylene glycol of molecular weight 20,000. | 2.0 | 1,400 | 2,050 |

The reaction was continued for 2 hours, removing the by-product methanol; the reaction vessel was gradually heated and its pressure reduced, to conduct the polymerization for 1 hour, at 275° C. 0.8–0.5 mm. Hg.

The resultant polymer was melt-spun from the spinning aperture located at the bottom of the reaction vessel. It was then treated for drawing and heat-treatment to provide white fiber having the maximum intrinsic viscosity ($\eta$) of 0.58. The fiber thus obtained was then dyed to a deep shade with a basic dye, Sevron Brilliant Red B (C.I. Basic 15) at 120° C., and was also deep dyed with a disperse dye, Dispersol Fast Orange B (C.I. Disperse Orange 13). Knitted cloth of the thus obtained fibers was brought to a distance of 5 cm. from a cigarette ash immediately after the cloth had been rubbed against cotton cloth. The knitted cloth did not adsorb the cigarette ash and the ash did not stir.

For purposes of comparison, the above process was repeated without the addition of the polyoxyalkylene sulfonate salt, the fiber thus obtained could neither be dyed with basic dyes nor disperse dyes, and the resulting knitted cloth vigorously adsorbed the cigarette ash immediately after the cloth had been rubbed against the cotton cloth.

EXAMPLE 17

The reactants:

| | Parts |
|---|---|
| Dimethyl terephthalate | 230 |
| Dimethyl isophthalate | 20 |
| Ethylene glycol | 240 |
| Calcium acetate | 0.2 | were charged to a reaction vessel, heated to 190° C., and agitated. The ester exchange reaction was conducted for 90 min. while removing the by-product methanol.

Trimethyl phosphate 0.1 part, antimony trioxide 0.1 part, titanium dioxide 0.8 part and 8 parts of

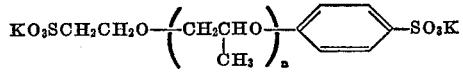

were added. The system was gradually heated to 290° C., and the pressure was reduced to 0.8 to 0.7 mm. Hg. The reaction was continued for 50 min. The resultant polymer was white and exhibited an intrinsic viscosity of 0.30. The resulting polymer chips could be easily processed by stable melt-spinning, drawing and heat-treatment. The product obtained was white, which was dyed to a deep shade with Basacryl Blue GL (C.I. Basic Blue 54). For comparison, the identical procedure was repeated without addition of

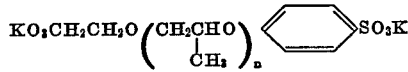

The fiber thus obtained was not dyed with Basacryl Blue GL.

EXAMPLE 18

| | Parts |
|---|---|
| Terephthalic acid | 200 |
| Ethylene glycol | 200 |
| Trisodium phosphate | 0.1 |

The above reactants were charged into a reaction vessel and reacted for 1 hour at 250° C., 2.8–3.3 kg./cm.² while removing by-product water from the system with a small amount of ethylene glycol. The pressure was restored to normal, while distilling out the excess ethylene glycol. Antimony trioxide 0.1 part, titanium dioxide 0.5 part and 15 parts of

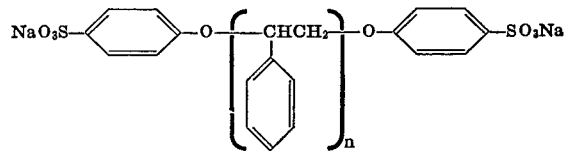

($n$: about 10) were added to the polymeric system; the polymerization was continued for 90 min., gradually heating the system to 280° C. and reducing the pressure to 1.0–0.7 mm. Hg. The polymer obtained was melt-spun from the spinning aperture at the bottom of the vessel. It was then treated for drawing and heat-treatment. The resultant fiber was white, with an intrinsic viscosity of 0.61. The basic dye-stuff, Astrazon Pink FG (C.I. Basic Red 13) was used to color the fiber under the same conditions as Example 1. The color of the fiber after dyeing was deep. On the other hand, a fiber produced in the same manner as in Example 3, but without the addition of the chemical compound as specified above could not be colored with the dyestuff, Astrazon Pink FG.

EXAMPLE 19

| | Parts |
|---|---|
| p($\beta$-Hydroxy-ethoxy) dimethyl benzoic acid | 250 |
| Antimony trioxide | 0.2 |
| Zinc acetate | 0.1 |

The above were charged to a reaction vessel and reacted for 1 hour at 200° C., and then for 1 hour at 250° C., while removing the by-product methanol. The system was then gradually reduced in pressure and allowed to react for an additional 5 hours at 250° C. The resultant polymer was white, having an intrinsic viscosity of 0.66.

100 parts of the resulting polymer and 5 parts of

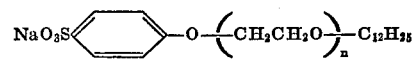

($n$: about 40) were fed to and spun by a melt-extruder after sufficiently mixing the two. The resulting fiber was then dyed with the basic dye, Sevron Brilliant Red B at 110° C. to a deep red.

EXAMPLES 20–30

Dimethyl terephthalate, ethylene glycol and a small amount of zinc diacetate and titanium dioxide were fed to a reactor, transesterified and polycondensed. Compounds (C) or (D) were added to the resultant molten polyethylene terephthalate and mixed.

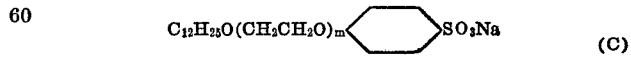

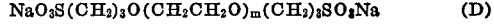

Continuous filaments were melt spun from the spinneret at the bottom of the reactor, drawn and heat-set. The fibers thus obtained were white and exhibited tensile strengths of 3.6–4.6 g./d., breaking elongation of 43–20%. The fibers were knitted to form cloths. No trouble was experienced in processing. The knitted cloths were subjected to the static electricity test, the results of which are summarized in Table 4.

The test method and the meaning of the symbols are the same as those employed in Table 1.

3,700,642

TABLE 4

| Examples | Amount of compound added (wt. percent) | | Avg. MW. of the polyoxyethylene radical | Charge potential (voltage) The first time | Charge potential (voltage) After washing 10 times | Test with cigarette ash | Observation |
|---|---|---|---|---|---|---|---|
| Example 20 | (C) | 1.0 | 600 | 90 | 100 | ◎ | |
| Control 28 | Polyethylene glycol | 1.0 | 600 | 3,800 | 3,750 | X | Drop in the viscosity at the time of addition remarkable; required re-polymerization. |
| Control 29 | (C) | 0.1 | 600 | 3,200 | 3,000 | X | |
| Example 21 | (C) | 2.0 | 600 | 90 | 110 | ◎ | |
| Control 30 | (C) | 5 | 600 | 80 | 100 | ◎ | Uneven drawing; too many naps; waxy to touch. |
| Control 31 | Polyethylene glycol | 5 | 600 | 3,250 | 3,600 | X | Drop in the viscosity at the time of addition remarkable; required re-polymerization; too many naps; waxy to touch. |
| Control 32 | (C) | 2.0 | 200 | 1,840 | 3,700 | O | Large particles observed; frequent breakage of thread. |
| Example 22 | (C) | 1.0 | 2,060 | 110 | 170 | ◎ | |
| Example 23 | (C) | 2.0 | 2,060 | 90 | 120 | ◎ | |
| Control 33 | (C) | 0.1 | 2,060 | 1,210 | 2,400 | O | |
| Control 34 | (C) | 5 | 2,060 | 65 | 90 | ◎ | |
| Control 35 | Polyethylene glycol | 2.0 | 2,060 | 2,900 | 3,900 | X | Drop in the viscosity at the time of addition remarkable; required re-polymerization. |
| Control 36 | do | 5.0 | 2,060 | 2,500 | 2,900 | X | Drop in the viscosity at the time of addition remarkable; required re-polymerization; uneven drawing; too many naps; waxy to touch. |
| Example 24 | (C) | 1.0 | 6,000 | 150 | 170 | ◎ | |
| Example 25 | (C) | 2.0 | 6,000 | 100 | 110 | ◎ | |
| Control 37 | (C) | 0.1 | 6,000 | 1,740 | 2,900 | △ | |
| Control 38 | Polyethylene glycol | 2.0 | 6,000 | 3,300 | 3,700 | X | Drop in the viscosity at the time of addition remarkable; required re-polymerization. |
| Control 39 | do | 2.0 | 20,000 | 2,250 | 2,200 | △ | Uneven drawing. |
| Control 40 | do | 0.1 | 20,000 | 4,050 | 4,640 | X | |
| Control 41 | None | 0 | 0 | 4,950 | 5,200 | X | |
| Example 26 | (D) | 1.0 | 600 | 80 | 80 | ◎ | |
| Control 42 | (D) | 0.1 | 600 | 1,050 | 1,530 | △ | |
| Control 43 | Polyethylene glycol | 1.0 | 600 | 3,830 | 3,510 | X | Drop in the viscosity at the time of addition great; required re-polymerization. |
| Example 27 | (D) | 2.0 | 600 | 50 | 80 | ◎ | |
| Control 44 | (D) | 5 | 600 | 50 | 65 | ◎ | Uneven drawing; waxy to touch. |
| Control 45 | Polyethylene glycol | 1.0 | 20,000 | 2,600 | 2,940 | X | |
| Control 46 | (D) | 1.0 | 200 | 550 | 1,540 | O | Large particles observed; frequent breakage of fiber at spinning. |
| Example 28 | (D) | 1.0 | 2,060 | 120 | 140 | ◎ | |
| Control 47 | (D) | 0.1 | 2,060 | 1,390 | 2,990 | △ | |
| Example 29 | (D) | 2.0 | 2,060 | 70 | 95 | ◎ | |
| Control 48 | (D) | 5 | 2,060 | 50 | 100 | ◎ | Uneven drawing; waxy to touch. |
| Control 49 | Polyethylene glycol | 1.0 | 2,060 | 3,070 | 4,000 | X | Drop in the viscosity at the time of addition; required re-polymerization. |
| Example 30 | (D) | 1.6 | 6,000 | 180 | 140 | ◎ | |
| Control 50 | (D) | 0.1 | 6,000 | 2,050 | 3,340 | X | |

What is claimed is:

1. Polyester compositions exhibiting improved dyeability and anti-static properties consisting essentially of an aromatic polyester and an effective amount of a polyoxyalkylene sulfonate represented by the formula:

$(MO_3S)_lRO(AO)_mR'(SO_3M')_n$ wherein A is an alkylene or aralkylene group; R and R' can be the same or different and are each selected from the group consisting of alkylene, arylene and alkarylene radicals; M and M' are alkali metals or alkaline earth metals; $m$ is an integer greater than 3; and $l$ and $n$ are numbers which may be the same or different and which range from 0 to 2, inclusive, and satisfy the relationship that $l+n \geq 1$.

2. Polyester compositions as defined in claim 1 containing an effective amount of a polyoxyalkylene sulfonate represented by the formula:

$R_1O(AO_mR'(SO_3M')_i$ wherein $R_1$ is an alkyl group containing from 1 to about 20 carbon atoms and $i$ is 1 or 2.

3. Polyester compositions as defined in claim 1 containing an effective amount of a polyoxyalkylene sulfonate represented by the formula:

$MO_3S(CH_2)_jO(AO)_m(CH_2)_kSO_3M'$ wherein $j$ and $k$ can be the same or different and can be 3 or 4.

4. Polyester compositions as defined in claim 1 wherein $m$ ranges from about 5 to about 30.

5. Polyester compositions as defined in claim 1 wherein the polyoxyalkylene sulfonate is admixed with the polyester in amounts ranging from about 0.5 to about 5 mole percent based on the acid component of the polyester.

6. Polyester compositions as defined in claim 1 wherein the average molecular weight of the alkyleneoxy or aralkyleneoxy moiety of the polyoxyalkylene sulfonate ranges from about 450 to about 10,000.

7. Polyester compositions as defined in claim 1 wherein the polyoxyalkylene sulfonate is admixed with the polyester in amounts ranging from about 0.2 to about 3% by weight.

8. Polyester compositions as defined in claim 7 wherein the polyoxyalkylene sulfonate is admixed with the polyester in amounts ranging from about 1 to about 2.5% by weight.

9. Polyester compositions as defined in claim 1 wherein M and M' can be the same or different and are selected from sodium or potassium.

10. Polyester compositions as defined in claim 1 wherein A is lower alkylene or ar(lower alkylene) and said aryl moiety contains from 6 to 12 carbon atoms.

11. Polyester compositions as defined in claim 1 wherein R and R' can be the same or different and are each selected from the group consisting of alkylene of from 1 to about 20 carbon atoms, arylene of from 6 to 12 carbon atoms and alkarylene of from about 7 to about 32 carbon atoms.

12. Polyester compositions as defined in claim 1 wherein the aromatic polyester is polyethylene terephthalate.

13. An improved polyester composition as claimed in claim 1, wherein the compound represented by the general formula is substantially dissolved in the polyester.

14. A fiber formed from a polyester composition as defined in claim 1.

15. A fiber formed from a polyester composition as defined in claim 13.

16. A film formed from a polyester composition as defined in claim 1.

References Cited

UNITED STATES PATENTS 3,004,006  10/1961  King et al. _____ 260—79.3

FOREIGN PATENTS 1,526,402  5/1968  France.

MELVIN GOLDSTEIN, Primary Examiner

U.S. Cl. X.R.

8—DIG 4

KRC-118

PO-1050
(5/69)

UNITED STATES PATENT OFFICE
CERTIFICATE OF CORRECTION

Patent No. 3,700,642                    Dated  October 24, 1972

Inventor(s)  Masao Mizuno and Keishiro Igi

It is certified that error appears in the above-identified patent and that said Letters Patent are hereby corrected as shown below:

Column 3, line 45, "$NaO_2S$" should be --$NaO_3S$--.

Column 3, line 74, "l" second occurrence, should be --i--.

Column 6, line 25, "metaal" should be --metal--.

Column 7, Table 1, column 5, "5,560" should be --5,360--.

Column 10, Table 3, column 5, "5,60⁰" should be --5,600--.

Signed and sealed this 2nd day of April 1974.

(SEAL)
Attest:

EDWARD M. FLETCHER, JR.          C. MARSHALL DANN
Attesting Officer                Commissioner of Patents